US012215458B2

United States Patent
Love et al.

(10) Patent No.: US 12,215,458 B2
(45) Date of Patent: Feb. 4, 2025

(54) WASHABLE MULTI-COMPONENT MAGNETIC FLOOR MAT

(71) Applicant: Mountville Mills, Inc., LaGrange, GA (US)

(72) Inventors: Franklin S. Love, Columbus, NC (US); Sudhanshu Srivastava, Greer, SC (US); Venkatkrishna Raghavendran, Houston, TX (US); Brandon T. Roberts, Greer, SC (US); Padmakumar Puthillath, Greer, SC (US); Dale S. Kitchen, Boiling Springs, SC (US); Ty G. Dawson, Spartanburg, SC (US)

(73) Assignee: Mountville Mills, Inc., LaGrange, GA (US)

( * ) Notice: Subject to any disclaimer, the term of this patent is extended or adjusted under 35 U.S.C. 154(b) by 0 days.

(21) Appl. No.: 18/425,280

(22) Filed: Jan. 29, 2024

(65) Prior Publication Data

US 2024/0167222 A1   May 23, 2024

Related U.S. Application Data

(60) Continuation of application No. 16/923,409, filed on Jul. 8, 2020, now abandoned, which is a division of
(Continued)

(51) Int. Cl.
*D06N 7/00* (2006.01)
*A47G 27/02* (2006.01)
(Continued)

(52) U.S. Cl.
CPC ........... *D06N 7/0071* (2013.01); *A47G 27/02* (2013.01); *A47G 27/0206* (2013.01);
(Continued)

(58) Field of Classification Search
CPC ................ A47G 27/02; A47G 27/0206; A47G 27/0406; A47G 27/0418; A47L 23/266;
(Continued)

(56) References Cited

U.S. PATENT DOCUMENTS

| 2,693,654 A | 11/1954 | Clark |
| 3,126,924 A | 3/1964 | Kirkpatrick |

(Continued)

FOREIGN PATENT DOCUMENTS

| AU | 198941219 | 3/1991 |
| AU | 682899 | 10/1997 |

(Continued)

OTHER PUBLICATIONS

Brainiac75 YouTube video "Spacer or No Spacer," https://youtu.be/9Q8qqUsNf-U, May 9, 2012.
(Continued)

*Primary Examiner* — Cheryl Juska
(74) *Attorney, Agent, or Firm* — Baker Donelson; Carl M. Davis, II

(57) ABSTRACT

This invention relates to a washable multi-component magnetic floor mat. The floor mat contains a textile component and a base component. The textile component and the base component are attached to one another by magnetic attraction. The magnetic attraction is provided by incorporation of magnetic particles in both the textile and base components. The textile component is designed to be soiled, washed, and re-used, thereby providing ideal end-use applications in areas such as building entryways. The present invention eliminates the need to wash the base component of the floor mat which results in environmental, cost and labor conservation. Alignment and deployment of the textile component with the base component in an efficient manner is also described herein.

12 Claims, 8 Drawing Sheets

Related U.S. Application Data application No. 16/109,890, filed on Aug. 23, 2018, which is a continuation of application No. 15/212,350, filed on Jul. 18, 2016, now abandoned.

(60) Provisional application No. 62/201,148, filed on Aug. 5, 2015.

(51) Int. Cl.
  *A47G 27/04* (2006.01)
  *A47L 23/26* (2006.01)
  *B32B 7/06* (2019.01)
  *B32B 7/08* (2019.01)

(52) U.S. Cl.
  CPC ..... *A47G 27/0406* (2013.01); *A47G 27/0418* (2013.01); *A47L 23/26* (2013.01); *A47L 23/266* (2013.01); *B32B 7/06* (2013.01); *B32B 7/08* (2013.01); *D06N 7/0063* (2013.01); *D06N 7/0065* (2013.01); *D06N 7/0068* (2013.01); *B32B 2307/208* (2013.01); *B32B 2471/04* (2013.01); *D06N 2201/08* (2013.01); *D06N 2201/082* (2013.01); *D06N 2203/061* (2013.01); *D06N 2205/20* (2013.01); *D06N 2209/045* (2013.01); *D06N 2211/066* (2013.01); *D10B 2503/04* (2013.01); *Y10T 428/23921* (2015.04); *Y10T 428/23979* (2015.04)

(58) Field of Classification Search
  CPC ......... B32B 7/06; B32B 7/08; B32B 2471/04; D06N 7/0063; D06N 7/0071; D06N 7/0068; D06N 2205/20; D06N 2209/045; D06N 2211/066; D10B 2503/04; Y10T 428/23921; Y10T 428/23979
  See application file for complete search history.

(56) References Cited

U.S. PATENT DOCUMENTS

| | | | |
|---|---|---|---|
| 3,305,428 A | 2/1967 | Moore | |
| 3,696,459 A | 10/1972 | Kucera | |
| 4,010,301 A | 3/1977 | Anderson | |
| 4,070,505 A | 1/1978 | Baril, Jr. | |
| 4,187,332 A | 2/1980 | Fouche, Jr. | |
| 4,353,944 A | 10/1982 | Tarui | |
| 4,361,925 A | 12/1982 | Yamamoto | |
| 4,397,900 A | 8/1983 | Higgins | |
| 4,405,674 A | 9/1983 | Kyle | |
| 4,454,183 A | 6/1984 | Wollman | |
| 4,515,850 A | 5/1985 | Ishino | |
| 4,578,132 A | 3/1986 | Van Uden | |
| 4,595,617 A | 6/1986 | Bogdany | |
| 4,678,533 A | 7/1987 | Barlett | |
| 4,716,065 A | 12/1987 | McLaughlin | |
| 4,769,895 A | 9/1988 | Parkins | |
| 5,035,017 A | 7/1991 | Komuro | |
| 5,077,870 A | 1/1992 | Melbye | |
| 5,096,764 A | 3/1992 | Terry | |
| 5,161,272 A | 11/1992 | Yamaguchi | |
| 5,198,278 A | 3/1993 | Sumimoto | |
| 5,524,317 A | 6/1996 | Nagahama | |
| 5,607,635 A | 3/1997 | Melbye | |
| 5,752,357 A | 5/1998 | Piller | |
| 5,811,165 A | 9/1998 | Andreen | |
| 5,845,735 A | 12/1998 | Muller | |
| 5,925,434 A | 7/1999 | Phillips | |
| 6,022,619 A | 2/2000 | Kuhn | |
| 6,083,596 A | 7/2000 | Pacione | |
| 6,093,469 A | 7/2000 | Callas | |
| 6,114,014 A | 9/2000 | Ikeda | |
| 6,219,876 B1 | 4/2001 | Blum | |
| 6,233,776 B1 | 5/2001 | Blum | |
| 6,250,001 B1 | 6/2001 | Gillespie | |
| 6,475,594 B2 | 11/2002 | Johnston | |
| 6,694,689 B1 | 2/2004 | Scott | |
| 6,821,573 B1 | 11/2004 | Paping | |
| 6,861,118 B2 | 3/2005 | Kobayashi | |
| 6,881,450 B1 | 4/2005 | Texier | |
| 6,913,810 B2 | 7/2005 | Wang | |
| 7,001,645 B1 | 2/2006 | Texier | |
| 7,022,394 B2 | 4/2006 | Fujisawa | |
| 7,096,642 B2 | 8/2006 | Higgins | |
| 7,125,595 B2 | 10/2006 | Kobayashi | |
| 7,188,396 B2 | 3/2007 | Melbye | |
| 7,338,698 B1 | 3/2008 | Bieser | |
| 7,416,771 B2 | 8/2008 | Bailey | |
| 7,504,131 B2 | 3/2009 | DeLeon | |
| 7,648,751 B2 | 1/2010 | Janzen | |
| 7,678,159 B1 | 3/2010 | Weiner | |
| 7,846,214 B1 | 12/2010 | Weiner | |
| 7,854,021 B2 | 12/2010 | Compton | |
| 7,993,717 B2 | 8/2011 | O'Connor | |
| 8,046,160 B2 | 10/2011 | Carter | |
| 8,056,295 B2 | 11/2011 | Cappelle | |
| 8,298,642 B2 | 10/2012 | Yuan | |
| 8,309,198 B2 | 11/2012 | Bell | |
| 8,656,682 B2 | 2/2014 | Williamson | |
| 9,028,951 B2 | 5/2015 | Boudouris | |
| 2002/0012764 A1 | 1/2002 | Magee | |
| 2002/0023308 A1 | 2/2002 | Blum | |
| 2002/0028313 A1 | 3/2002 | Blum | |
| 2002/0034606 A1 | 3/2002 | Miller | |
| 2002/0092110 A1 | 7/2002 | Blum | |
| 2003/0161990 A1 | 8/2003 | Higgins | |
| 2003/0165657 A1 | 9/2003 | Rockwell | |
| 2003/0180499 A1 | 9/2003 | Kobayashi | |
| 2004/0013849 A1 | 1/2004 | Kobayashi | |
| 2004/0022994 A1 | 2/2004 | Higgins | |
| 2004/0053002 A1 | 3/2004 | Kobayashi | |
| 2004/0197522 A1 | 10/2004 | Reisdorf | |
| 2004/0253410 A1* | 12/2004 | Higgins | B32B 5/026 428/113 |
| 2005/0025930 A1 | 2/2005 | Hamrick | |
| 2005/0064242 A1 | 3/2005 | Schneider | |
| 2005/0079316 A1 | 4/2005 | Kobayashi | |
| 2005/0079317 A1 | 4/2005 | Nord | |
| 2005/0091936 A1 | 5/2005 | Galloway | |
| 2006/0057328 A1 | 3/2006 | Pacione | |
| 2006/0107480 A1 | 5/2006 | Degrandi | |
| 2006/0147892 A1 | 7/2006 | Moore | |
| 2007/0190287 A1 | 8/2007 | Seto | |
| 2007/0202293 A1 | 8/2007 | Powell | |
| 2007/0275207 A1 | 11/2007 | Higgins | |
| 2007/0286982 A1 | 12/2007 | Higgins | |
| 2008/0152902 A1 | 6/2008 | Adler | |
| 2008/0190042 A1 | 8/2008 | Williamson | |
| 2008/0261004 A1 | 10/2008 | Higgins | |
| 2008/0263922 A1 | 10/2008 | Ho | |
| 2009/0029096 A1 | 1/2009 | Riddle | |
| 2009/0029097 A1 | 1/2009 | Riddle | |
| 2009/0110869 A1 | 4/2009 | Streeton | |
| 2009/0191401 A1 | 7/2009 | Deetz | |
| 2009/0304985 A1 | 12/2009 | Yuan | |
| 2011/0008567 A1 | 1/2011 | Weeks | |
| 2011/0054074 A1 | 3/2011 | Jonschker | |
| 2011/0123758 A1 | 5/2011 | Pollaud | |
| 2011/0201241 A1 | 8/2011 | Rubino | |
| 2011/0229692 A1 | 9/2011 | Bozouklian | |
| 2012/0000156 A1 | 1/2012 | Esposito | |
| 2012/0019022 A1 | 1/2012 | Cianci | |
| 2013/0056672 A1 | 3/2013 | Johnston | |
| 2013/0099438 A1 | 4/2013 | Mann | |
| 2013/0198990 A1 | 8/2013 | Hawkins | |
| 2014/0137377 A1 | 5/2014 | Cheng | |
| 2014/0141198 A1 | 5/2014 | Teran | |
| 2014/0223684 A1 | 8/2014 | Hawkins | |
| 2015/0017376 A1 | 1/2015 | Smith | |
| 2015/0061173 A1 | 3/2015 | Murata | |
| 2015/0140341 A1 | 5/2015 | Robinson | |
| 2016/0037949 A1 | 2/2016 | Dawson | |

(56) References Cited

U.S. PATENT DOCUMENTS

| | | | |
|---|---|---|---|
| 2016/0319553 A1 | 11/2016 | Lautzenhiser | |
| 2016/0375673 A1 | 12/2016 | Lautzenhiser | |
| 2017/0020299 A1* | 1/2017 | Valenta | A47C 21/046 |
| 2017/0035214 A1* | 2/2017 | Srivastava | A47C 31/003 |
| 2017/0037567 A1 | 2/2017 | Love | |
| 2017/0037629 A1* | 2/2017 | Srivastava | E04F 13/0883 |
| 2017/0105563 A1 | 4/2017 | Dawson | |
| 2017/0136724 A1 | 5/2017 | Dawson | |
| 2017/0136730 A1 | 5/2017 | Dawson | |
| 2017/0182497 A1 | 6/2017 | Hasson | |
| 2017/0282498 A1 | 10/2017 | Love | |
| 2017/0355837 A1 | 12/2017 | Bomfim | |
| 2017/0360274 A1 | 12/2017 | Love | |
| 2018/0055266 A1 | 3/2018 | Puthillath | |
| 2018/0056626 A1 | 3/2018 | Puthillath | |
| 2018/0289238 A1 | 10/2018 | Vogt | |
| 2018/0290428 A1 | 10/2018 | Puthillath | |
| 2018/0305860 A1* | 10/2018 | Mondal | D06M 15/507 |
| 2018/0363239 A1 | 12/2018 | Love | |
| 2018/0363240 A1 | 12/2018 | Love | |
| 2019/0000254 A1 | 1/2019 | Puthillath | |

FOREIGN PATENT DOCUMENTS

| | | |
|---|---|---|
| AU | 2011100493 A4 | 7/2011 |
| CH | 526291 A | 8/1972 |
| CN | 1034482 A | 8/1989 |
| CN | 2183017 Y | 11/1994 |
| CN | 1107028 A | 8/1995 |
| CN | 101028164 | 9/2007 |
| CN | 200942000 Y | 9/2007 |
| CN | 101078182 | 11/2007 |
| CN | 102125421 | 7/2011 |
| CN | 201929663 | 8/2011 |
| CN | 201958557 U | 9/2011 |
| CN | 202653826 | 1/2013 |
| CN | 103507305 | 1/2014 |
| CN | 104095504 A | 10/2014 |
| CN | 104771048 | 7/2015 |
| CN | 204635728 | 9/2015 |
| DE | 2413183 | 10/1974 |
| DE | 199211303 | 12/1992 |
| DE | 19956319 | 6/2001 |
| DE | 20300915 | 5/2003 |
| DE | 10084239 | 8/2007 |
| DE | 102010023402 A1 | 6/2011 |
| DE | 102010020922 | 11/2011 |
| EP | 0321978 A1 | 6/1989 |
| EP | 0541531 | 5/1993 |
| EP | 0609208 | 8/1994 |
| EP | 0653179 A1 | 5/1995 |
| EP | 0724660 B1 | 6/1997 |
| EP | 1091038 | 4/2001 |
| EP | 1788148 | 5/2007 |
| EP | 2602385 | 6/2013 |
| GB | 875807 | 8/1961 |
| GB | 2195531 B | 1/1990 |
| GB | 2476133 | 6/2011 |
| JP | 49001606 Y | 1/1974 |
| JP | S58112835 | 7/1983 |
| JP | 2003246037 | 9/2003 |
| JP | 2004052159 | 2/2004 |
| JP | 2004167819 | 6/2004 |
| JP | 2004353107 | 12/2004 |
| JP | 2005307377 | 11/2005 |
| JP | 2006296501 | 11/2006 |
| JP | 4170953 | 10/2008 |
| JP | 2008245825 | 10/2008 |
| JP | 2009035850 | 2/2009 |
| JP | 4545019 | 9/2010 |
| JP | 2011163114 | 8/2011 |
| JP | 2012165990 A | 9/2012 |
| JP | 2014129681 | 7/2014 |
| KR | 200307262 Y1 * | 3/2003 |
| MX | PA06010218 A | 3/2008 |
| WO | 1987002564 | 5/1987 |
| WO | 0016682 A1 | 3/2000 |
| WO | 2000016682 | 3/2000 |
| WO | 2001025514 | 4/2001 |
| WO | 2002065451 A1 | 8/2002 |
| WO | 2002072154 | 9/2002 |
| WO | 03106161 A1 | 12/2003 |
| WO | 2003106161 | 12/2003 |
| WO | 2004037063 A1 | 5/2004 |
| WO | 2004043539 | 5/2004 |
| WO | 2006103436 | 10/2006 |
| WO | 2006127873 A1 | 11/2006 |

OTHER PUBLICATIONS

Google Patents translation of MX PA06010218, 2008. 6 pages.
JPO translation of JP 49-001606Y, 1974. 3 pages.
Patent Cooperation Treaty PCT International Search Report. Date of Mailing, Dec. 21, 2016. International Application No. PCT/US2016/043834. International Filing Date, Jul. 25, 2016. (5 pages).
Stress Relaxation of tufted Carpets and Carpet Components. Phillips, Kristie Jo; issue date: Oct. 28, 2002. Located via: google Scholar. (154 pages).
Title: Billboard Mats URL: http://www.billboardmats.com/BillboardMats.html. Located Via: Google.com (1 page) Date unavailable.
Title: MatMates™ Interchangeable Doormats URL: http://www.windsensations.com/Mat-Mates-s/202.htm. Located Via: Google.com (1 page) Date unavailable.
Title: Nanosols and Textiles. Boris Mahltig, Torsten Textor. Copyright 2008 by World Scientific Publishing Co. Pte. Ltd.; pp. 109-126.
U.S. Appl. No. 14/735,184; Title: Interchangeable Logo Mat; filed Jun. 10, 2015 (20 pages).

* cited by examiner

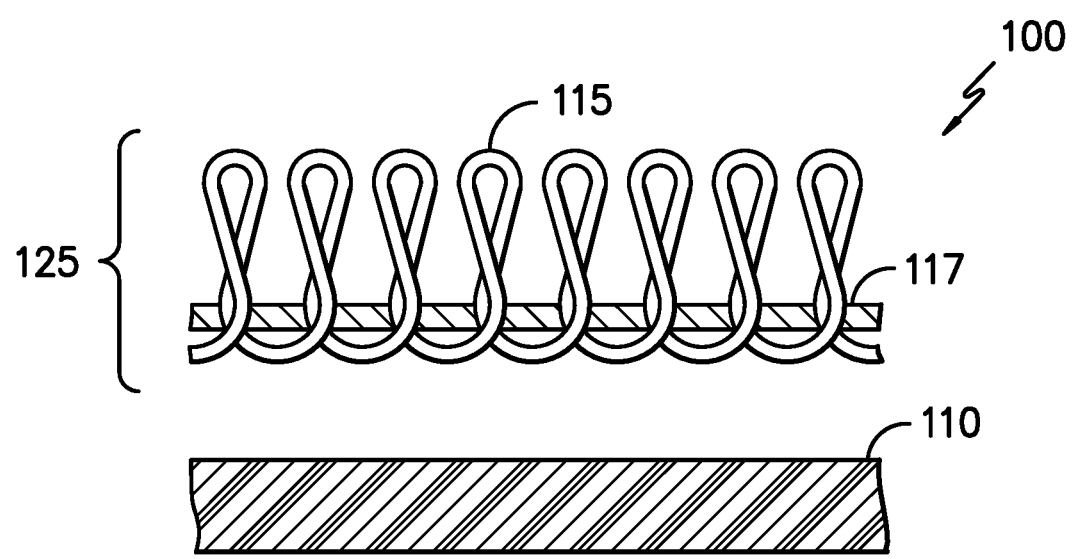
FIG. -1A-

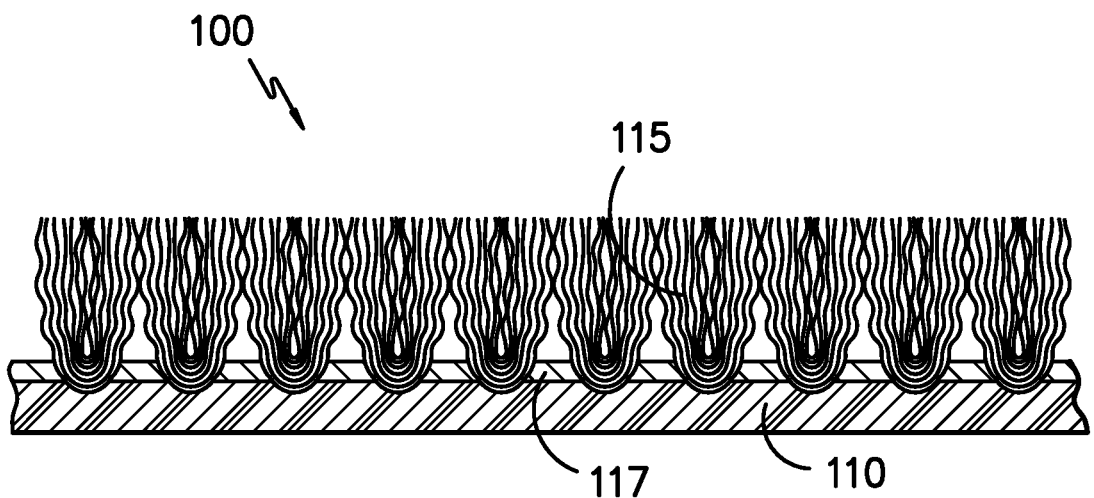
FIG. -1B-
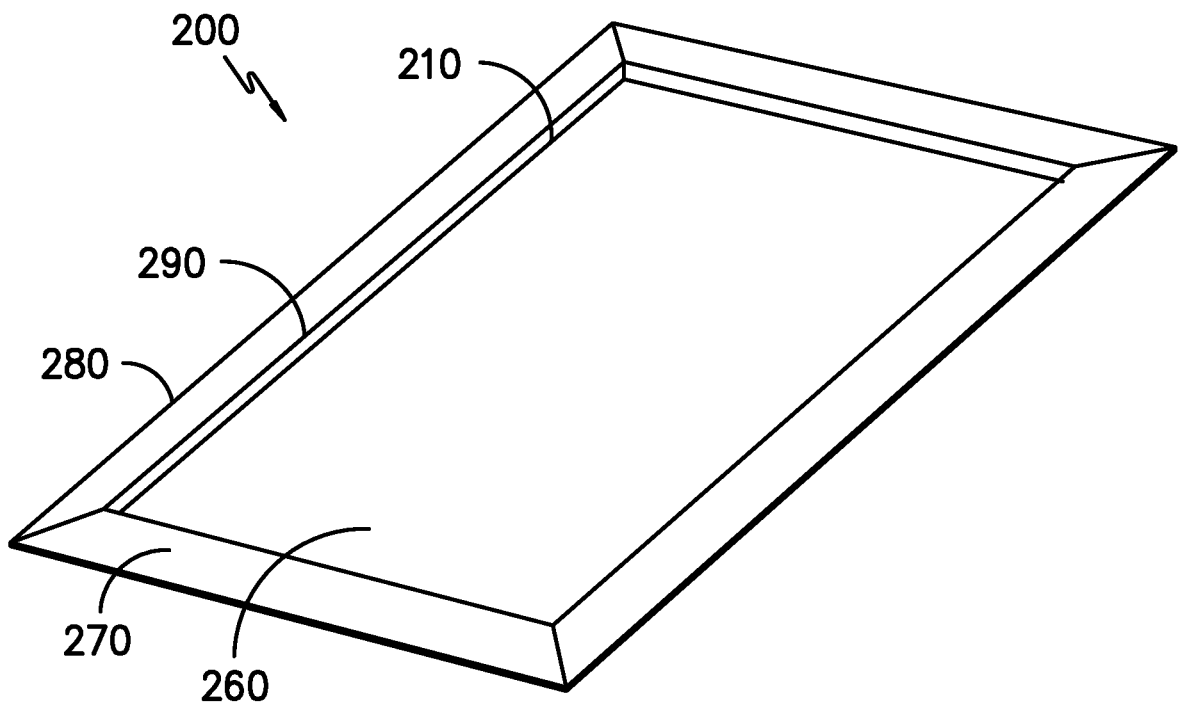
FIG. -2A-

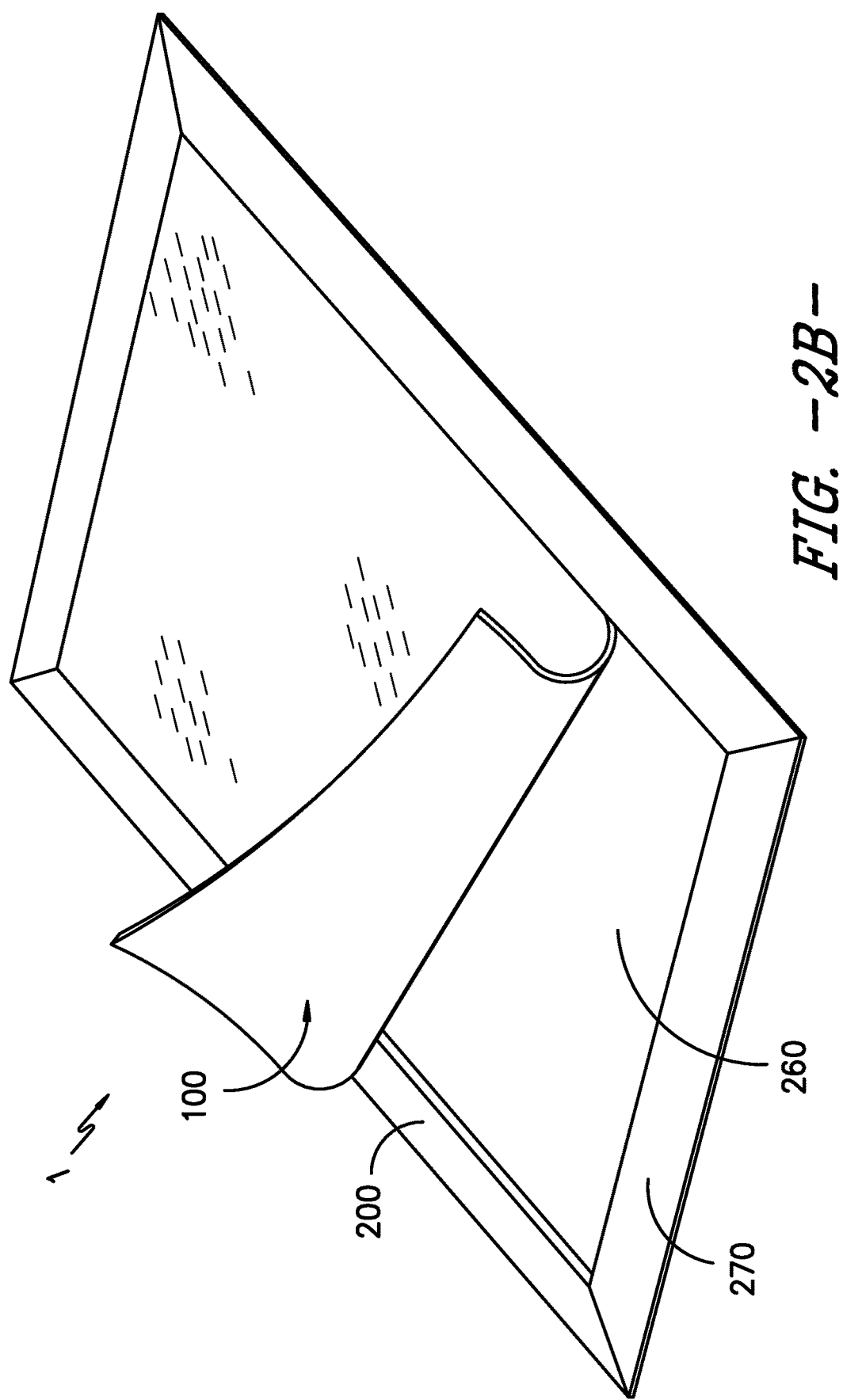
FIG. -2B-

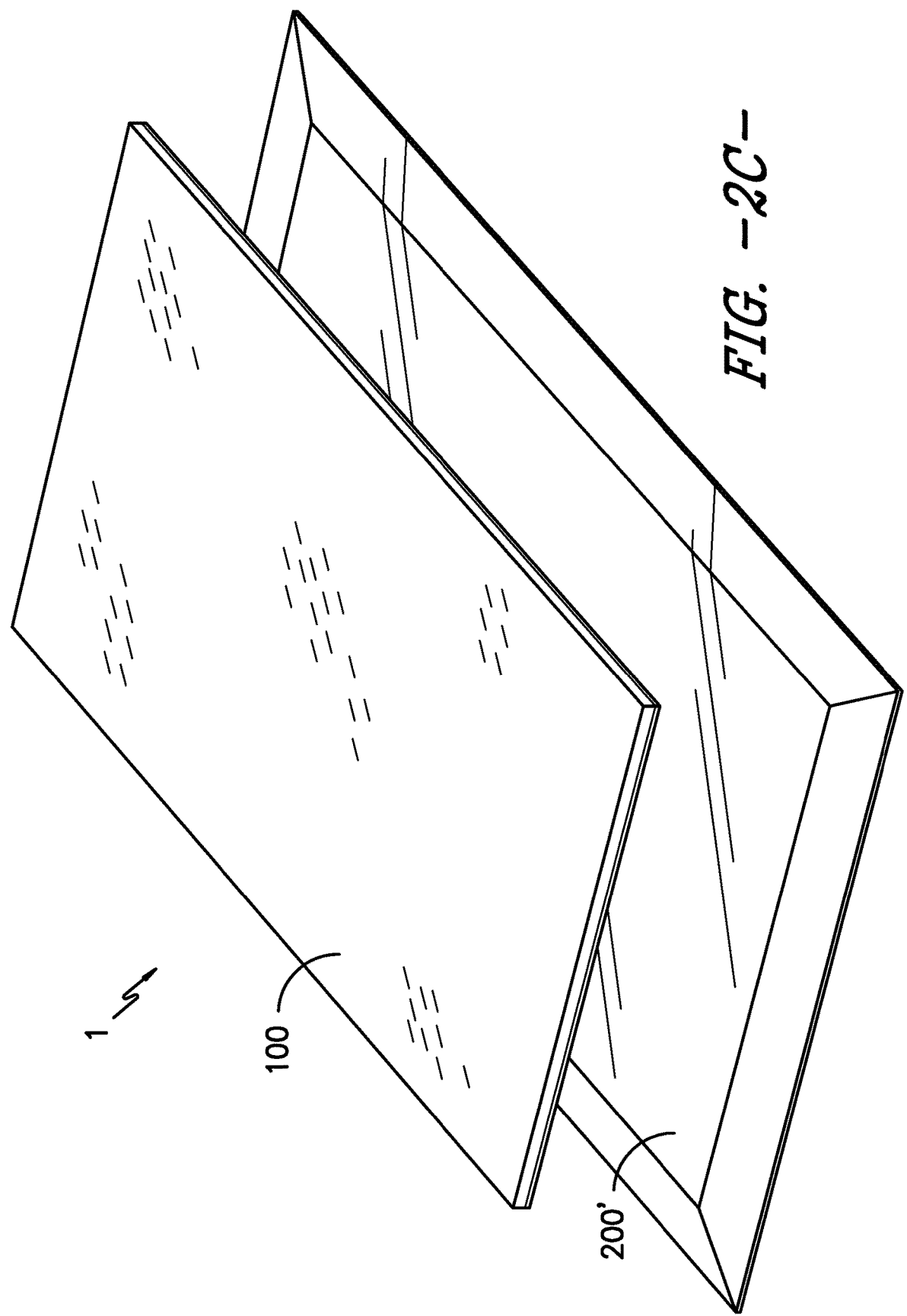

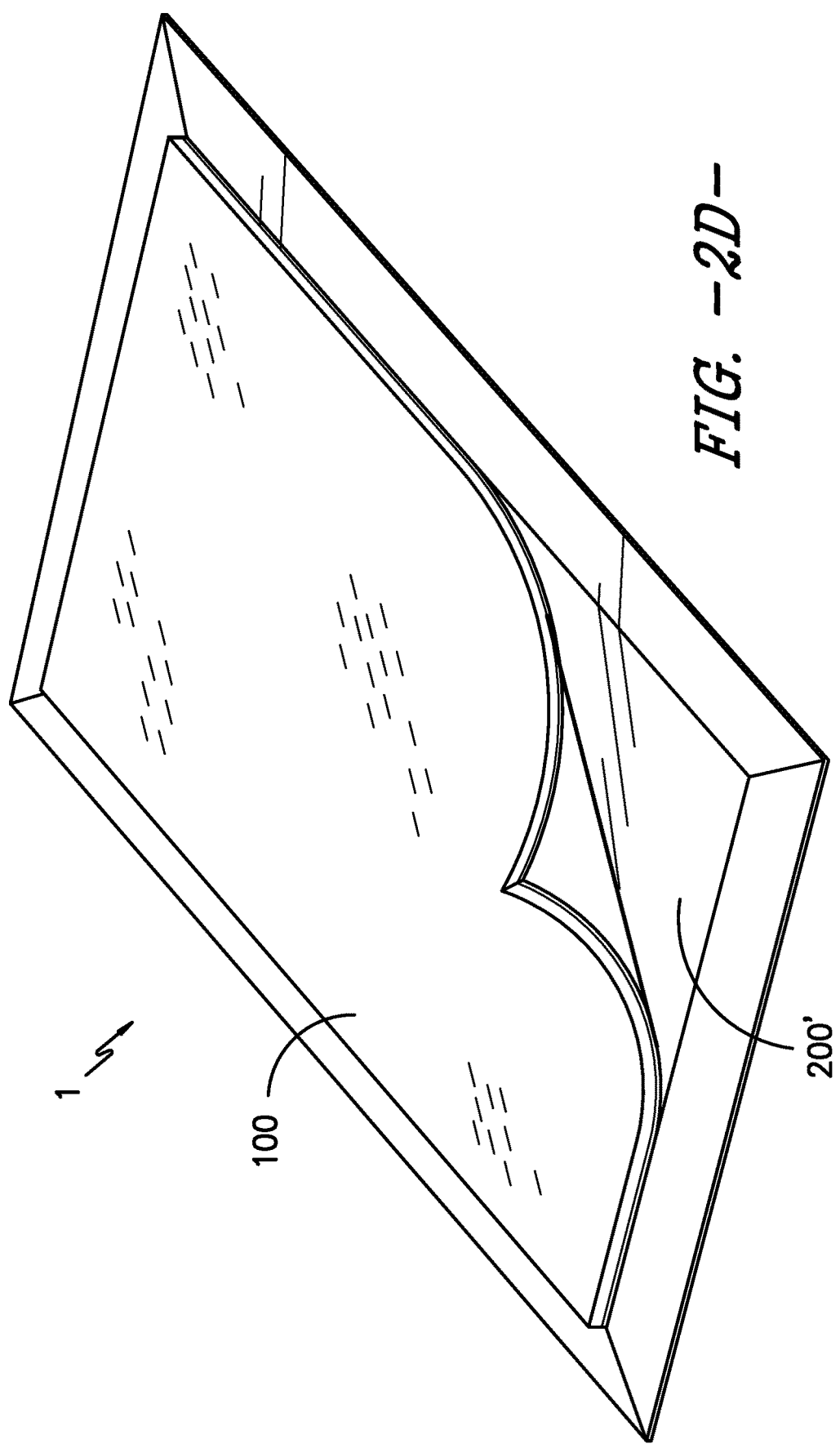
FIG. -2D-

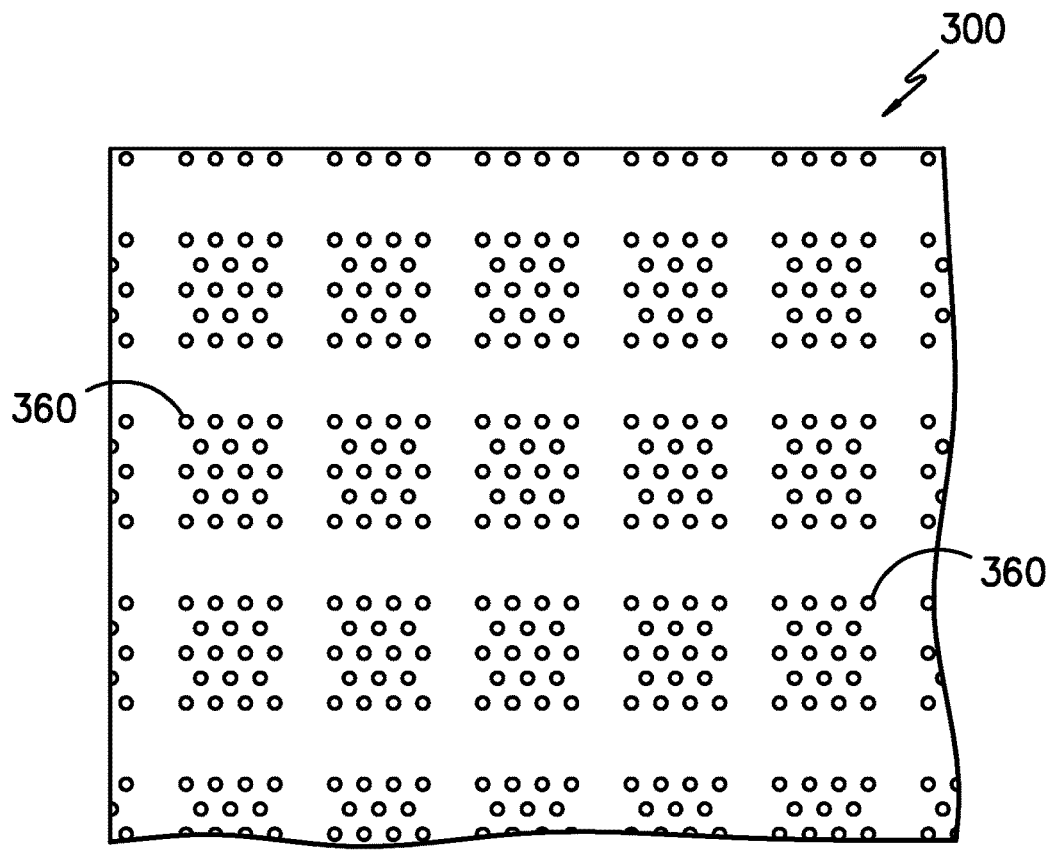
FIG. -3A-
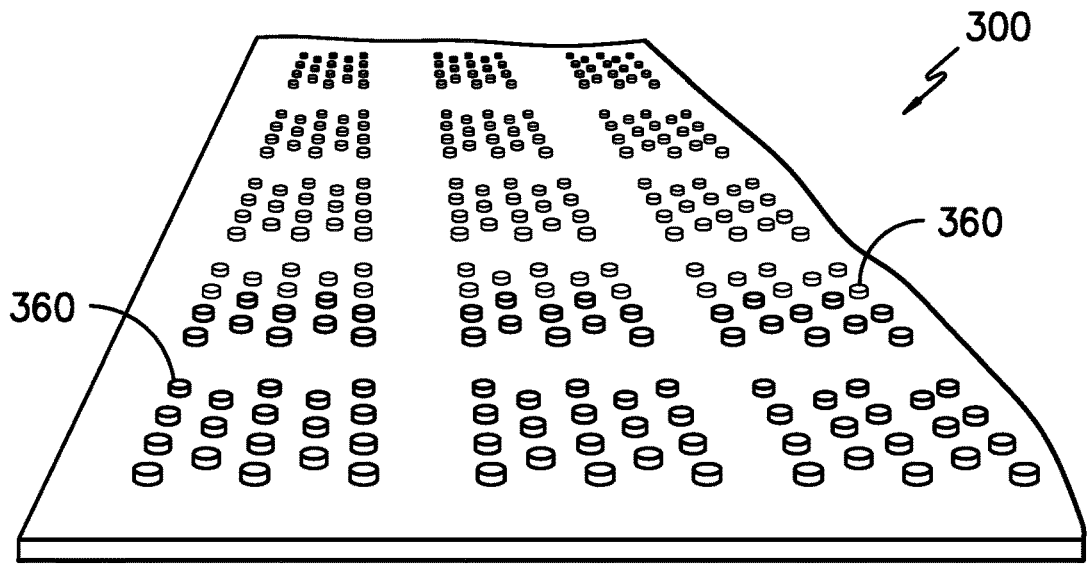
FIG. -3B-

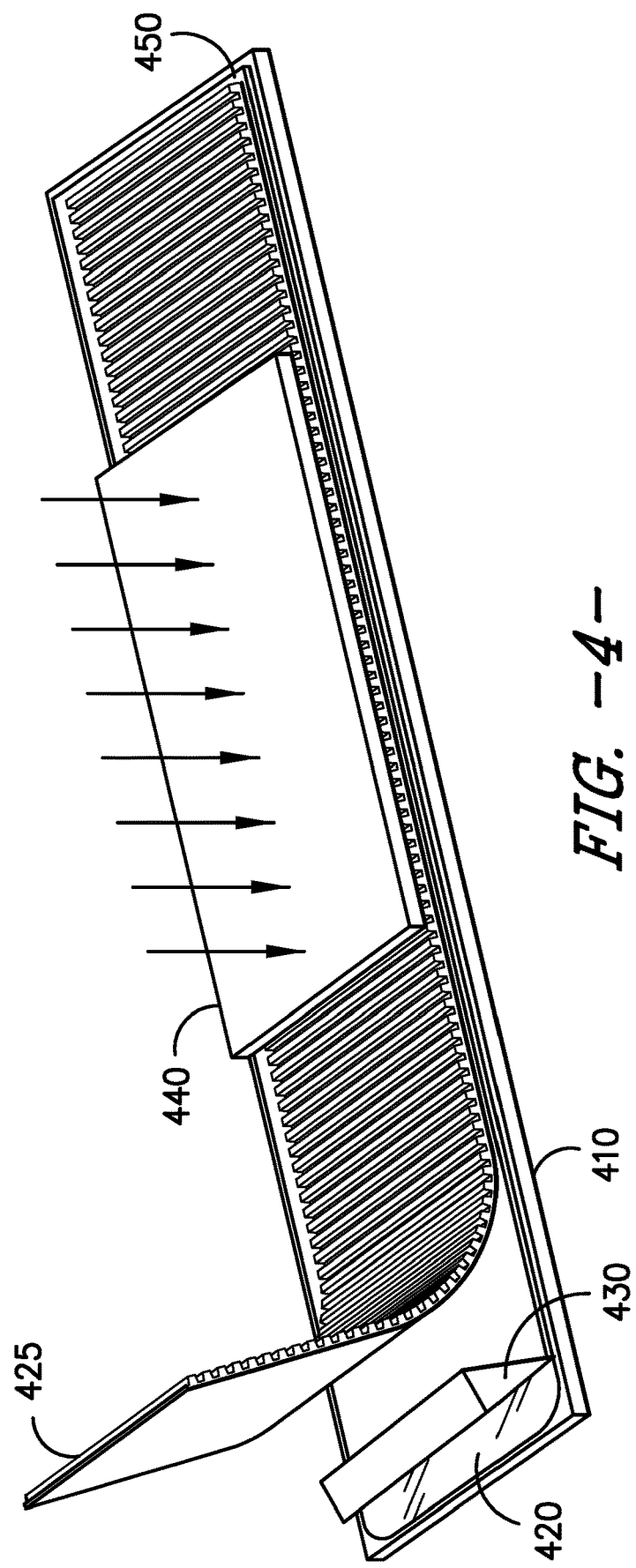
FIG. -4-

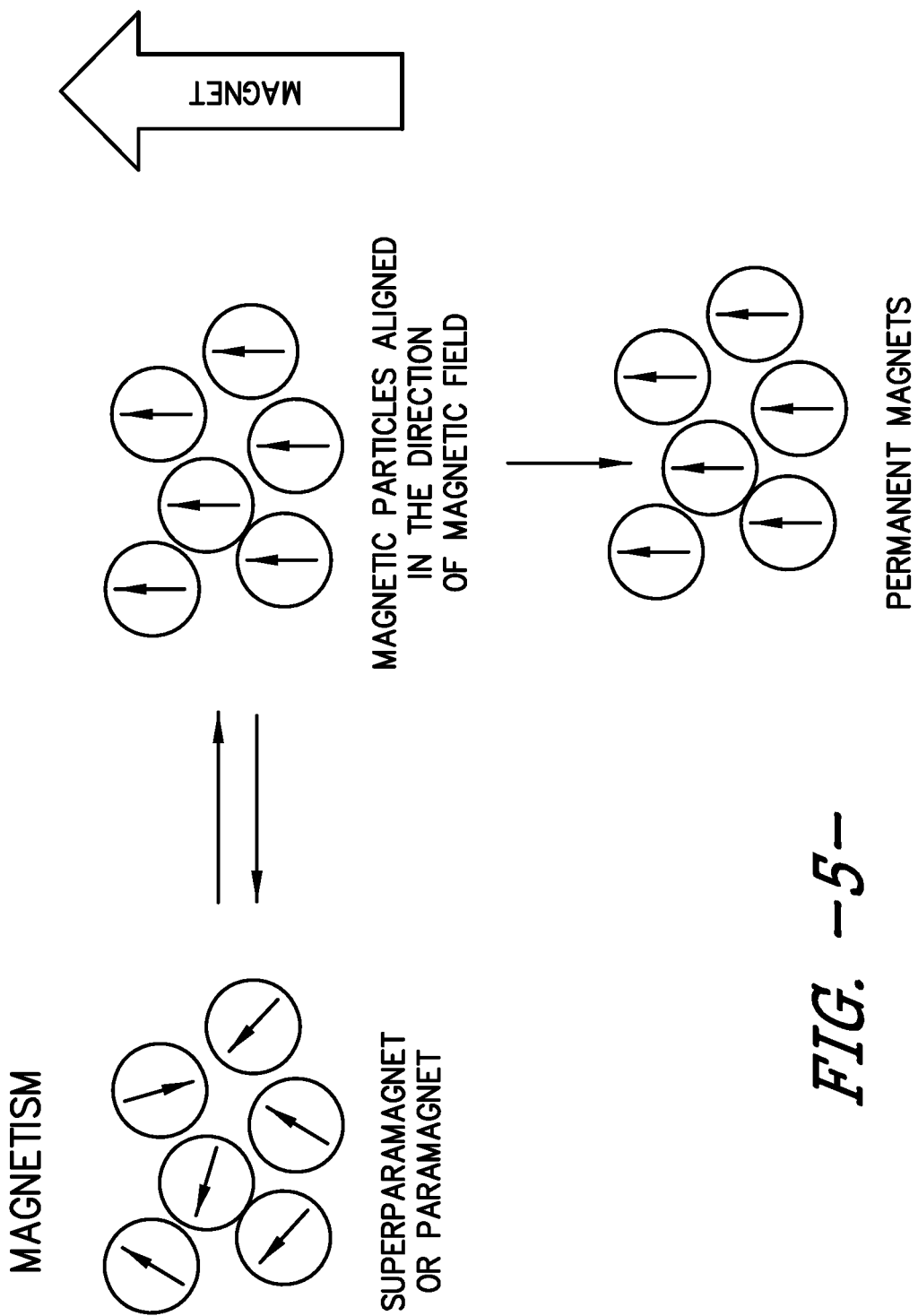
FIG. -5-

WASHABLE MULTI-COMPONENT MAGNETIC FLOOR MAT

CROSS REFERENCE TO RELATED APPLICATIONS

This application is a continuation of and claims priority to U.S. patent application Ser. No. 16/923,409 entitled "Washable Multi-Component Magnetic Floor Mat" which was filed on Jul. 8, 2020, which is a division of and claims priority to U.S. patent application Ser. No. 16/109,890 entitled "Washable Multi-Component Magnetic Floor Mat" which was filed on Aug. 23, 2018, which is a continuation of and claims priority to U.S. patent application Ser. No. 15/212,350, entitled "Washable Multi-Component Magnetic Floor Mat" which was filed on Jul. 18, 2016, which is a non-provisional of and claims priority to U.S. Provisional Patent Application No. 62/201,148, entitled "Washable Multi-Component Magnetic Floor Mat" which was filed on Aug. 5, 2015, all of which are entirely incorporated by reference herein.

TECHNICAL FIELD

This invention relates to a washable multi-component magnetic floor mat. The floor mat contains a textile component and a base component. The textile component and the base component are attached to one another by magnetic attraction. The magnetic attraction is provided by incorporation of magnetic particles in both the textile and base components. The textile component is designed to be soiled, washed, and re-used, thereby providing ideal end-use applications in areas such as building entryways. The present invention eliminates the need to wash the base component of the floor mat which results in environmental, cost and labor conservation. Alignment and deployment of the textile component with the base component in an efficient manner is also described herein.

BACKGROUND

High traffic areas, such as entrances to buildings, restrooms, break areas, etc., typically have the highest floorcovering soiling issue. Currently, washable one-piece mats having a pile surface are found in these locations. The washable multi-component magnetic floor mat of the present invention is designed to replace these one-piece floor mats. The use of washable multi-component floor mats in high traffic, highly soiled areas is pragmatic because the soiled textile component may be easily removed, laundered, and re-installed. The need to launder the base portion of the floor mat is eliminated. The reduction in weight and bulk from one-piece mats to the textile component of the multi-component mat provides significant savings in water and energy for the laundering facilities and in labor for the service people that transport and install the floor mats.

Furthermore, because the attachment mechanisms can utilize a high amount of force to hold the top and bottom components of the floor mat together, the initial alignment and deployment of the top textile component onto the base component can present challenges. This problem is exaggerated by the large surface area of the two components that are in contact with one another. In this regard, even if the adherence force per unit area is low, the large surface area means that the total resistance to sliding and movement can be very high making realignment of the components very difficult. If not corrected, mis-alignment of the textile component with the base component may create trip hazards within the floor mat and may be aesthetically not pleasing.

The present invention overcomes these challenges via the use of alignment and deployment techniques that rely upon temporary reduction in surface area of the textile and/or base component and/or temporary reduction in adherence force between the textile and base components. Thus, the washable multi-component magnetic floor mats of the present invention are an improvement over one-piece floor mats of the prior art.

BRIEF SUMMARY

In one aspect, the invention relates to a multi-component floor mat comprising: (a) a textile component comprising (i) a first layer of tufted pile carpet formed by tufting face yarns through a primary backing layer and (ii) a second layer of vulcanized rubber material that contains magnetic particles; (b) a base component comprised of (i) vulcanized rubber that contains magnetic particles or (ii) vulcanized rubber having a magnetic coating applied thereto; and wherein the textile component and the base component are releasably attachable to one another via magnetic attraction.

In another aspect, the invention relates to a multi-component floor mat comprising: (a) a textile component comprising (i) tufted pile carpet wherein face yarns are tufted through a primary backing layer and (ii) a magnetic coating wherein the magnetic coating is comprised of magnetic particles and a binder material; (b) a base component comprised of (i) vulcanized rubber that contains magnetic particles or (ii) vulcanized rubber having a magnetic coating applied thereto; wherein the textile component and the base component are releasably attachable to one another via magnetic attraction.

In another aspect, the invention relates to a multi-component floor mat comprising: (a) a textile component comprising (i) a first layer of tufted pile carpet wherein face yarns are tufted through a primary backing layer and (ii) a second layer of vulcanized rubber material that contains magnetic particles or a second layer of magnetic coating; (b) a base component comprised of (i) vulcanized rubber and magnetic particles or vulcanized rubber and a magnetic coating and (ii) electronic sensors; wherein the textile component and the base component are releasably attachable to one another via magnetic attraction.

In a further aspect, the invention relates to a process for cleaning a multi-component floor mat, said process comprising the steps of: (a) providing the multi-component floor mat of the present invention; (b) removing the textile component from the base component; (c) laundering the textile component in an industrial, commercial, or residential washing machine; and (d) re-installing the textile component on or within the base component.

In another aspect, the invention relates to a process for making a multi-component floor mat, said process comprising the steps of: (a) tufting face yarns into a primary backing material to form a tufted pile carpet; (b) optionally, printing the tufted pile carpet; (c) providing a layer of unvulcanized rubber that contains magnetic particles; (d) adhering the tufted pile carpet to the layer of magnetic particle-containing unvulcanized rubber via a rubber vulcanization process to form a washable textile component having a vulcanized rubber backing; (e) cutting the textile component into a desired shape and size; (f) providing a base component comprised of (i) vulcanized rubber and magnetic particles or (ii) vulcanized rubber and a magnetic coating; and (g) attaching the textile component to the base component via magnetic attraction.

In a further aspect, the invention relates to a process for making a multi-component floor mat, said process comprising the steps of: (a) tufting face yarns into a primary backing material to form a tufted pile carpet; (b) optionally, printing the tufted pile carpet; (c) providing a magnetic coating comprised of magnetic particles and a binder material; (d) adhering the magnetic coating to the tufted pile carpet to form a washable textile component; (e) cutting the textile component into a desired shape and size; (f) providing a base component comprised of (i) vulcanized rubber and magnetic particles or (ii) vulcanized rubber and a magnetic coating; and (g) attaching the textile component to the base component via magnetic attraction.

In yet a further embodiment, the invention relates to a method for installation of a multi-component floor mat comprising the following steps: (a) providing a base component, wherein the base component contains at least one attachment means; (b) providing a textile component, wherein the textile component is comprised of tufted pile carpet and contains at least one attachment means that works in corresponding relationship with the at least one attachment means of step "a," and wherein the base component and the textile component are releasably attachable to one another via the at least one attachment means; (c) aligning the textile component with the base component, wherein the step of aligning is accomplished via the use of at least one alignment or deployment mechanism; and (d) deploying the textile component onto the base component.

In yet another aspect, this invention relates to a multi-component floor mat comprising: (a) a textile component comprising (i) a first layer of tufted pile carpet formed by tufting face yarns through a primary backing layer and (ii) a second layer of vulcanized rubber material that contains magnetic particles; and (b) a base component comprised of (i) materials selected from the group consisting of concrete, cellulose-containing materials, metal, thermoplastic materials, thermoset materials, and combinations thereof, and (ii) magnetic particles or a magnetic coating applied to the base component; and wherein the textile component and the base component are releasably attachable to one another via magnetic attraction.

BRIEF DESCRIPTION OF THE DRAWINGS

FIG. 1A is an expanded view of the textile component of the floor mat.

FIG. 1B is an expanded view of another embodiment of the textile component of the floor mat.

FIG. 2A is a top perspective view of one embodiment of the base component of the floor mat.

FIG. 2B is a top perspective view of the multi-component floor mat with the textile component partially pulled back from the recessed area of a base component.

FIG. 2C is a top perspective view of the multi-component floor mat with the textile component and a flat (no recessed area) base component.

FIG. 2D is a top perspective view of the multi-component floor mat with the textile component partially pulled back from the flat (no recessed area) base component.

FIG. 3A is an expanded planar view of a rubber gripping pattern present on the back of the base component of the floor mat.

FIG. 3B is an expanded angle view of a rubber gripping pattern present on the back of the base component of the floor mat.

FIG. 4 is a schematic diagram of one embodiment of the manufacturing process of the multi-component floor mat.

FIG. 5 is a schematic diagram illustrating the magnetic alignment properties of the magnetic particles of the present invention.

DETAILED DESCRIPTION

The present invention described herein is a washable multi-component magnetic floor mat. The mat is comprised of a textile component and a base component. The textile component and the base component are attached to one another via magnet attraction.

The base component of the floor mat may be partially or wholly covered with a textile component. Typically, the textile component will be lighter in weight than the base component. Inversely, the base component will weigh more than the textile component.

As shown in FIG. 1A, textile component 100 may be comprised of tufted pile carpet 125. Tufted pile carpet 125 is comprised of primary backing layer 117 and face yarns 115. The primary backing layer 117 is typically included in the tufted pile carpet to give stability to the face yarns. The materials comprising face yarns 115 and primary backing layer 117 may independently be selected from synthetic fiber, natural fiber, man-made fiber using natural constituents, inorganic fiber, glass fiber, and a blend of any of the foregoing. By way of example only, synthetic fibers may include polyester, acrylic, polyamide, polyolefin, polyaramid, polyurethane, or blends thereof. More specifically, polyester may include polyethylene terephthalate, polytrimethylene terephthalate, polybutylene terephthalate, polylactic acid, or combinations thereof. Polyamide may include nylon 6, nylon 6,6, or combinations thereof. Polyolefin may include polypropylene, polyethylene, or combinations thereof. Polyaramid may include poly-p-phenyleneteraphthalamide (i.e., Kevlar®), poly-m-phenyleneteraphthalamide (i.e., Nomex®), or combinations thereof. Exemplary natural fibers include wool, cotton, linen, ramie, jute, flax, silk, hemp, or blends thereof. Exemplary man-made materials using natural constituents include regenerated cellulose (i.e., rayon), lyocell, or blends thereof.

The material comprising face yarns 115 and primary backing layer 117 may be formed from staple fiber, filament fiber, slit film fiber, or combinations thereof. The fiber may be exposed to one or more texturing processes. The fiber may then be spun or otherwise combined into yarns, for example, by ring spinning, open-end spinning, air jet spinning, vortex spinning, or combinations thereof. Accordingly, the material comprising face yarns 115 will generally be comprised of interlaced fibers, interlaced yarns, loops, or combinations thereof.

The material comprising face yarns 115 and primary backing layer 117 may be comprised of fibers or yarns of any size, including microdenier fibers or yarns (fibers or yarns having less than one denier per filament). The fibers or yarns may have deniers that range from less than about 0.1 denier per filament to about 2000 denier per filament or, more preferably, from less than about 1 denier per filament to about 500 denier per filament.

Furthermore, the material comprising face yarns 115 and primary backing layer 117 may be partially or wholly comprised of multi-component or bi-component fibers or yarns in various configurations such as, for example, islands-in-the-sea, core and sheath, side-by-side, or pie configurations. Depending on the configuration of the bi-component or multi-component fibers or yarns, the fibers or yarns may be splittable along their length by chemical or mechanical action.

Additionally, face yarns 115 and primary backing layer 117 may include additives coextruded therein, may be precoated with any number of different materials, including those listed in greater detail below, and/or may be dyed or colored to provide other aesthetic features for the end user with any type of colorant, such as, for example, poly (oxyalkylenated) colorants, as well as pigments, dyes, tints, and the like. Other additives may also be present on and/or within the target fiber or yarn, including antistatic agents, brightening compounds, nucleating agents, antioxidants, UV stabilizers, fillers, permanent press finishes, softeners, lubricants, curing accelerators, and the like.

The face yarns 115 may be dyed or undyed. If the face yarns 115 are dyed, they may be solution dyed. The weight of the face yarn, pile height, and density will vary depending on the desired aesthetics and performance requirements of the end-use for the floor mat. In FIG. 1A, face yarns 115 are illustrated in a loop pile construction. Looking to FIG. 1B, textile component 100 is shown with face yarns 115 in a cut pile construction. Of course, it is to be understood that face yarn constructions including combinations of loop pile and cut pile may likewise be used.

The primary backing layer 117 can be any suitable primary backing material. The primary backing layer 117 may be comprised of a woven, nonwoven or knitted material, or combinations thereof. The general purpose of primary backing layer 117 is to support the tufts of face yarns 115. In one aspect, primary backing layer 117 is a nonwoven polyester spunbond material. One commercially available example of the polyester spunbond material is Lutradur® from Freudenberg Nonwovens of Weinheim, Germany. In another aspect, flat woven polyester tapes, such as Isis™ from Propex of Chattanooga, TN, may be utilized. Also, Colback® nonwoven backing material may also be suitable for use. If needed, a primary backing layer made of a woven tape with either staple fibers or nonwoven fabrics affixed can be used. Also, stitch bonded and knitted polyester fabrics may be used.

The tufted pile carpet 125 that includes face yarns tufted into a primary backing layer may be heat stabilized to prevent dimensional changes from occurring in the finished mat. The heat stabilizing or heat setting process typically involves applying heat to the material that is above the glass transition temperature, but below the melting temperature of the components. The heat allows the polymer components to release internal tensions and allows improvement in the internal structural order of the polymer chains. The heat stabilizing process can be carried out under tension or in a relaxed state. The tufted pile carpet is sometimes also stabilized to allow for the yarn and primary backing to shrink prior to the mat manufacturing process.

In one aspect of the present invention, the tufted pile carpet is comprised of yarn tufted into fabric, which is then injection or fluid dyed, and then bonded with a rubber layer or washable latex backing. The carpet yarn may be selected from nylon 6; nylon 6,6; polyester; and polypropylene fiber. The yarn is tufted into a woven or nonwoven substrate. The yarn can be of any pile height and weight necessary to support printing. The tufted pile carpet may be printed using any print process. In one aspect, injection dyeing may be utilized to print the tufted pile carpet.

Printing inks will contain at least one dye. Dyes may be selected from acid dyes, direct dyes, reactive dyes, cationic dyes, disperse dyes, and mixtures thereof. Acid dyes include azo, anthraquinone, triphenyl methane and xanthine types. Direct dyes include azo, stilbene, thiazole, dioxsazine and phthalocyanine types. Reactive dyes include azo, anthraquinone and phthalocyanine types. Cationic dyes include thiazole, methane, cyanine, quinolone, xanthene, azine, and triaryl methine. Disperse dyes include azo, anthraquinone, nitrodiphenylamine, naphthal imide, naphthoquinone imide and methane, triarylmethine and quinoline types.

As is known in the textile printing art, specific dye selection depends upon the type of fiber and/or fibers comprising the washable textile component that is being printed. For example, in general, a disperse dye may be used to print polyester fibers. Alternatively, for materials made from cationic dyeable polyester fiber, cationic dyes may be used.

The printing process of the present invention uses a jet dyeing machine, or a digital printing machine, to place printing ink on the surface of the mat in predetermined locations. One suitable and commercially available digital printing machine is the Millitron® digital printing machine, available from Milliken & Company of Spartanburg, South Carolina. The Millitron® machine uses an array of jets with continuous streams of dye liquor that can be deflected by a controlled air jet. The array of jets, or gun bars, is typically stationary. Another suitable and commercially available digital printing machine is the Chromojet® carpet printing machine, available from Zimmer Machinery Corporation of Spartanburg, South Carolina. In one aspect, a tufted carpet made according to the processes disclosed in U.S. Pat. Nos. 7,678,159 and 7,846,214, both to Weiner, may be printed with a jet dyeing apparatus as described and exemplified herein.

Viscosity modifiers may be included in the printing ink compositions. Suitable viscosity modifiers that may be utilized include known natural water-soluble polymers such as polysaccharides, such as starch substances derived from corn and wheat, gum arabic, locust bean gum, tragacanth gum, guar gum, guar flour, polygalactomannan gum, xanthan, alginates, and a tamarind seed; protein substances such as gelatin and casein; tannin substances; and lignin substances. Examples of the water-soluble polymer further include synthetic polymers such as known polyvinyl alcohol compounds and polyethylene oxide compounds. Mixtures of the aforementioned viscosity modifiers may also be used. The polymer viscosity is measured at elevated temperatures when the polymer is in the molten state. For example, viscosity may be measured in units of centipoise at elevated temperatures, using a Brookfield Thermosel unit from Brookfield Engineering Laboratories of Middleboro, MA. Alternatively, polymer viscosity may be measured by using a parallel plate rheometer, such as made by Haake from Rheology Services of Victoria Australia.

After printing, the tufted pile carpet may be vulcanized with a rubber backing. The thickness of the rubber will be such that the height of the finished textile component will be substantially the same height as the surrounding base component when the base component is provided in a tray configuration. Once vulcanized, the textile component may be pre-shrunk by washing.

The textile component 100 further comprises a magnetic coating layer 110. The magnetic coating layer 110 is present on the surface of the textile component 100 that is opposite face yarns 115. Application of magnetic coating layer 110 to the tufted pile carpet 125 will be described in greater detail below. The resulting textile component 100 is wash durable and exhibits sufficient tuft lock for normal end-use applications. In one alternative embodiment of the invention, the textile component may be a disposable textile component that is removed and disposed of or recycled and then replaced with a new textile component for attachment to the base component.

After the textile component has been made, it will be custom cut to fit into the recessed area of the base component (for instances in which the base component is in the form of a tray) or onto the base component (for instances wherein the base component is substantially flat/trayless/without recessed area). The textile component may be cut using a computer controlled cutting device, such as a Gerber machine. It may also be cut using a mechanical dye cutter, hot knife, straight blade, or rotary blade. In one aspect of the invention, the thickness of the textile component will be substantially the same as the depth of the recessed area when the base component is in the form of a tray.

FIG. 2A illustrates one embodiment of the base component of the floor mat of the present invention. Referring to FIG. 2A, base component 200 contains recessed area 260 surrounded by border 270. Border 270 slopes gradually upward from outer perimeter 280 to inner perimeter 290, to create recess 210 within base 200, corresponding to the recessed area of 260. FIG. 2A illustrates that the recessed area 260 of base component 200 possesses a certain amount of depth, thereby defining it as "recessed." The depth of recessed area 260 is illustrated by 210.

The base component is a planar-shaped tray, which is sized to accommodate the textile component. The base component may also include a border surrounding the tray, whereby the border provides greater dimensional stability to the tray, for example, because the border is thicker, i.e. greater in height relative to the floor. Additionally, the border may be angled upward from its outer perimeter towards the interior of the base component, so as to provide a recessed area where the tray is located, thereby creating a substantially level area between the inner perimeter of the border and the textile component, when the textile component overlays the tray. Additionally, the gradual incline from the outer perimeter of the border to the inner perimeter of the border minimizes tripping hazards and the recess created thereby protects the edges of the textile component.

It can be understood that the base component may be subdivided into two or more recessed trays, by extending a divider from one side of the border to an opposite side of the border, substantially at the height of the inner perimeter. Accordingly, it would be possible to overlay two or more textile components in the recesses created in the base component.

The base component, including the border, may be formed in a single molding process as a unitary article. Alternatively, the border and the tray may be molded separately and then bonded together in a second operation. The tray and border may be made of the same or different materials. Examples of suitable compositions for forming the border and the tray are elastomers, such as natural and synthetic rubber materials, thermoplastic and thermoset resins and metal. The rubber material may be selected from the group consisting of nitrile rubber, including dense nitrile rubber, foam nitrile rubber, and mixtures thereof; polyvinyl chloride rubber; ethylene propylene diene monomer (EPDM) rubber; vinyl rubber; thermoplastic elastomer; and mixtures thereof. In one aspect, the base component is typically comprised of at least one rubber material. The rubber material may contain from 0% to 40% of a recycled rubber material.

In one aspect, the base component may be formed into a tray shape according to the following procedure. Rubber strips are placed overlapping the edges of a metal plate. The metal plate is to be placed on top of a sheet rubber and covered on all 4 sides by strip rubber. As the mat is pressed, it will bond the sheet rubber to the strips. This process may be completed, for example, at a temperature of 370° F. and a pressure of 36 psi. However, depending upon the rubber materials selected, the temperature may be in the range from 200° F. to 500° F. and the pressure may be in the range from 10 psi to 50 psi. Using the recommend settings, the mat may be completely cured in 8 minutes. After the rubber strips are bound to the rubber sheet, the metal plate is removed leaving a void (i.e. a recessed area in the base component) in which to place the textile component. The textile component has the ability to be inserted and removed from the base component multiple times.

As seen in FIG. 2B, floor mat 1 is present in an arrangement wherein textile component 100 overlays recessed area 260 of base component 200. A corner of textile component 100 is turned back to further illustrate how the two components fit together within border 270.

As previously discussed herein, the base component of the floor mat may be in the form a tray. However, in one alternative embodiment, the base component of the floor mat may be flat and have no recessed area (i.e. the base component is trayless). A flat base component is manufactured from a sheet of material, such as a rubber material, that has been cut in the desired shape and vulcanized.

FIG. 2C illustrates a multi-component floor mat 1 wherein textile component 100 is combined with base component 200' that is flat and has no recessed area (i.e. trayless). FIG. 2D shows the multi-component floor mat 1 wherein both textile component 100 and base component 200' are assembled together.

FIGS. 3A and 3B illustrate one embodiment of the back surface of the base component. The back surface of the base component is the surface which lies on the floor and therefore has direct contact with the surface of the floor. Various patterns and/or protrusions on the back surface of the base component may be present so as to facilitate the base component's adherence to the floor. As illustrated in FIGS. 3A and 3B, protrusions 360 may be present on the back surface of base component 300. The protrusions 360 may be present in a repeating pattern such that a three dimensional array of protrusions is formed having a uniform pattern.

The textile component and the base component are attached to one another by magnetic attraction. Magnetic attraction is achieved via application of a magnetic coating to the textile component and/or base component or via incorporation of magnetic particles in a rubber-containing layer prior to vulcanization. Alternatively, magnetic attraction can be achieved using both methods such that a magnetic coating is applied to the textile component and magnetic particles are included in the vulcanized rubber of the base component. The inverse arrangement is also contemplated.

The magnetic coating may be applied to the textile component and/or the base component by several different manufacturing techniques. Exemplary coating techniques include, without limitation, knife coating, pad coating, paint coating, spray application, roll-on-roll methods, troweling methods, extrusion coating, foam coating, pattern coating, print coating, lamination, and mixtures thereof.

FIG. 4 illustrates one embodiment of the manufacturing process of the textile component of the present invention. The uncoated tufted pile carpet 425 is fed to laminating belt

410. The belt moves through the coating zone to lamination zone of the lamination press. A magnetic coating 420 is fed transversely to laminating belt 410. As magnetic coating 420 is fed to laminating belt 410, it passes under coating knife 430. The coating knife 430 is adjusted so that the desired coating thickness is achieved. For example, a magnetic coating thickness of 25 mil may be desirable. After magnetic coating 420 passes under coating knife 430, it comes into contact with tufted pile carpet 425. The magnetic coating 420 and tufted pile carpet 425 then move transversely to laminating press 440. Laminating press 440 is located above laminating belt 410. The laminating press 440 is lowered onto laminating belt 410, pressing tufted pile carpet 425 and magnetic coating 420 together. The laminating press 440 is heated and therefore provides both heat and pressure to the lamination process. Providing heat at this point of the lamination process further serves to cure any materials (e.g. binder materials) that may be contained within the magnetic coating. After a pre-determined amount of time, laminating press 440 is lifted from laminating belt 410. The magnetic coating 420 is now laminated to tufted pile carpet 425 to form textile component 450. In one aspect, the laminating press may be operated at a temperature in the range from 200° F. to 500° F. and at a pressure in the range from 10 psi to 50 psi, or even at 300° F. and a pressure of 36 psi.

In instances wherein magnetic attraction is achieved by incorporating magnetic particles in a rubber-containing layer, the following procedure may be utilized: (a) an unvulcanized rubber-containing material is provided (such as nitrile, SBR, or EPDM rubber), (b) magnetic particles are added to the unvulcanized rubber, (c) the particles are mixed with the rubber, and (d) the mixture of step "c" is formed into a sheet and attached to the bottom of the textile component and/or represents the base component. Mixing in step "c" may be achieved via a rubber mixing mill.

FIG. 5 is provided in order to illustrate some of the terms used herein with respect to various types of magnets and magnetization properties. In this application, magnetizable is defined to mean the particles present in the coating or vulcanized rubber layer are permanently magnetized or can be magnetized permanently using external magnets or electromagnets. Once the particles are magnetized, they will keep their magnetic response permanently. The magnetizable behavior for generating permanent magnetism falls broadly under ferromagnets and ferrimagnets. Barium ferrites, strontium ferrites, neodymium and other rare earth metal based alloys are non-limiting examples of materials that can be applied in the magnetic coatings and/or vulcanized rubber layer.

As used herein, magnetically receptive is defined to mean the particles present in the coating and/or vulcanized rubber layer are only magnetically responsive in the presence of external magnets. The component that contains the magnetic particles is exposed to a magnetic field which aligns the dipoles of magnetic particles. Once the magnetic field is removed from the vicinity, the particles will become non-magnetic and the dipoles are no longer aligned. The magnetically receptive behavior or responsive magnetic behavior falls broadly under paramagnets or superparamagnets (particle size less than 50 nm).

This feature of materials being reversibly magnetic is shown in FIG. 5 whereby the dipoles of the superparamagnetic or paramagnetic materials are not aligned, but upon exposure to a magnet, the dipoles line up and point in the same direction thereby allowing the materials to exhibit magnetic properties. Non-limiting examples of materials exhibiting these features include iron oxide, steel, iron, nickel, aluminum, or alloys of any of the foregoing.

Further examples of magnetizable magnetic particles include $BaFe_3O_4$, $SrFe_3O_4$, NdFeB, AlNiCo, CoSm and other rare earth metal based alloys, and mixtures thereof. Examples of magnetically receptive particles include $Fe_2O_3$, $Fe_3O_4$, steel, iron particles, and mixtures thereof. The magnetically receptive particles may be paramagnetic or superparamagnetic. The magnet particles are typically characterized as being non-degradable.

In one aspect of the invention, particle size of the magnetically receptive particles is in the range from 1 micron to 10 microns. Particle size of the magnetically receptive particles may be in the range from 10 nm to 50 nm for superparamagnetic materials. Particle size of the magnetically receptive particles is typically greater than 100 nm for paramagnetic and/or ferromagnetic materials.

Magnetic attraction is typically exhibited at any loading of the above magnetic materials. However, the magnetic attraction increases as the loading of magnetic material increases. In one aspect of the invention, the magnetic field strength of the textile component to the base component is greater than 50 gauss, more preferably greater than 100 gauss, more preferably greater than 150 gauss, or even more preferably greater than 200 gauss.

In one aspect, the magnetic material is present in the coating composition in the range from 25% to 95% by weight of the coating composition. In another aspect, magnetic particle loading may be present in the magnetic coating applied to the textile component in the range from 10% to 70% by weight of the textile component. The magnetic particle loading may be present in the magnetic coating applied to the base component in the range from 10% to 90% by weight of the base component.

The magnetically receptive particles may be present in the vulcanized rubber layer of the textile component in a substantially uniform distribution. In another aspect of the present invention, it is contemplated that the magnetically receptive particles are present in the rubber layer of the textile component in a substantially non-uniform distribution. One example of a non-uniform distribution includes a functionally graded particle distribution wherein the concentration of particles is reduced at the surface of the textile component intended for attachment to the base component. Alternatively, another example of a non-uniform distribution includes a functionally graded particle distribution wherein the concentration of particles is increased at the surface of the textile component intended for attachment to the base component.

The magnetic attraction between the textile component and the base component may be altered by manipulation of the surface area of one or both of the textile and/or base components. The surfaces of one or both of the components may be textured in such a way that surface area of the component is increased. Such manipulation may allow for customization of magnetic attraction that is not directly affected by the amount of magnetic particles present in the floor mat.

For instance, a substantially smooth (less surface area) bottom surface of the textile component will generally result in greater magnetic attraction to the top surface of the base component. In contrast, a less smooth (more surface area) bottom surface of the textile component (e.g. one having ripples or any other textured surface) will generally result in less magnetic attraction to the top surface of the base component. Of course, a reverse arrangement is also contemplated wherein the base component contains a textured surface. Furthermore, both component surfaces may be textured in such a way that magnetic attraction is manipulated to suit the end-use application of the inventive floor mat.

As discussed previously, the magnetic particles may be incorporated into the floor mat of the present invention either by applying a magnetic coating to surface of the textile component or by including the particles in the rubber material of the textile material and/or the base component prior to vulcanization. When incorporation is via a magnetic coating, a binder material is generally included. Thus, the magnetic coating is typically comprised of at least one type of magnetic particles and at least one binder material.

The binder material is typically selected from a thermoplastic elastomer material and/or a thermoplastic vulcanite material. Examples include urethane-containing materials, acrylate-containing materials, silicone-containing materials, and mixtures thereof. Barium ferrites, strontium ferrites, neodymium and other rare earth metal based alloys can be mixed with the appropriate binder to be coated on the textile and/or base component.

In one aspect, the binder material will exhibit at least one of the following properties: (a) a glass transition ($T_g$) temperature of less than 10° C.; (b) a Shore A hardness in the range from 30 to 90; and (c) a softening temperature of greater than 70° C.

In one aspect, an acrylate and/or urethane-containing binder system is combined with $Fe_3O_4$ to form the magnetic coating of the present invention. The ratio of $Fe_3O_4$:acrylate and/or urethane binder is in the range from 40-70%: 60:30% by weight. The thickness of the magnetic coating may be in the range from 10 mil to 40 mil. Such a magnetic coating exhibits flexibility without any cracking issues.

Following application or inclusion of the magnetic particles into the textile and/or base component, the particles need to be magnetized. Magnetization can occur either during the curing process or after the curing process. Curing is typically needed for the binder material that is selected and/or for the rubber material that may be selected.

During the curing process, the magnetizable particles are mixed with the appropriate binder and applied via a coating technique on the substrate to be magnetized. Once the coating is complete, the particles are magnetized in the presence of external magnets during the curing process. The component that contains the magnetic particles is exposed to a magnetic field which aligns the dipoles of magnetic particles, locking them in place until the binder is cured. The magnetic field is preferably installed in-line as part of the manufacturing process. However, the magnetic field may exist as a separate entity from the rest of the manufacturing equipment.

Alternatively, the magnetic particles may be magnetized after the curing process. In this instance, the magnetizable particles are added to the binder material and applied to the textile and/or base component in the form of a film or coating. The film or coating is then cured. The cured substrate is then exposed to at least one permanent magnet. Exposure to the permanent magnet may be done via direct contact with the coated substrate or via indirect contact with the coated substrate. Direct contact with the permanent magnet may occur, for example, by rolling the permanent magnet over the coated substrate. The magnet may be rolled over the coated substrate a single time or it may be rolled multiple times (e.g. 10 times). The permanent magnet may be provided in-line with the manufacturing process, or it may exist separately from the manufacturing equipment. Indirect contact may include a situation wherein the coated substrate is brought close to the permanent magnet, but does not contact or touch the magnet.

Depending upon the pole size, strength and domains on the permanent magnet (or electromagnet), it can magnetize the magnetizable coating to a value between 10 and 5000 gauss or a value close to the maximum gauss value of the magnetizing medium. Once the coating is magnetized, it will typically remain permanently magnetized.

It is further contemplated to be within the scope of the present invention that the base component of the multi-component floor mat is comprised of any substance that includes a magnetic material. The base component does not have to be comprised of vulcanized rubber. Instead, the base component may be comprised of concrete, cellulose-containing materials (e.g. wood), metal, thermoplastic materials, thermoset materials, and the like, and combinations thereof. In one instance, the base component may be the floor itself where the textile component is to be installed. Herein, the floor would include at least one magnetic material that is used to adhere the textile component to the floor. The textile component can then be laid directly on the floor which has at least one magnetic material applied thereto. Suitable magnetic materials include any of those described previously herein. In one aspect, the magnetic materials may be incorporated into a paint composition and applied to the floor. Or, an electromagnetic force may be applied to the area where the textile component is to be installed. Any of these magnetic features will provide the necessary adherence of the textile component to the floor without the need for a vulcanized rubber base component.

Floor mats of the present invention may be of any geometric shape or size as desired for its end-use application. The longitudinal edges of the floor mats may be of the same length and width, thus forming a square shape. Or, the longitudinal edges of the floor mats may have different dimensions such that the width and the length are not the same. Alternatively, the floor mats may be circular, hexagonal, and the like. As one non-limiting example, floor mats of the present invention may be manufactured into any of the current industry standards sizes that include 2 feet by 4 feet, 3 feet by 4 feet, 3 feet by 5 feet, 4 feet by 6 feet, 3 feet by 10 feet, and the like.

The washable floor mat of the present invention may be exposed to post treatment steps. For example, chemical treatments such as stain release, stain block, antimicrobial resistance, bleach resistance, and the like, may be added to the washable mat. Mechanical post treatments may include cutting, shearing, and/or napping the surface of the washable multi-component floor mat.

The performance requirements for commercial matting include a mixture of well documented standards and industry known tests. Tuft Bind of Pile Yarn Floor Coverings (ASTM D1335) is one such performance test referenced by several organizations (e.g. General Services Administration). Achieving tuft bind values greater than 4 pounds is desirable, and greater than 5 pounds even more desirable.

Resistance to Delamination of the Secondary Backing of Pile Yarn Floor Covering (ASTM D3936) is another standard test. Achieving Resistance to Delamination values greater than 2 pounds is desirable, and greater than 2.5 pounds even more desirable.

Pilling and fuzzing resistance for loop pile (ITTS112) is a performance test known to the industry and those practiced in the art. The pilling and fuzzing resistance test is typically a predictor of how quickly the carpet will pill, fuzz and prematurely age over time. The test uses a small roller covered with the hook part of a hook and loop fastener. The hook material is Hook 88 from Velcro of Manchester, NH and the roller weight is 2 pounds. The hook-covered wheel is rolled back and forth on the tufted carpet face with no additional pressure. The carpet is graded against a scale of 1 to 5. A rating of 5 represents no change or new carpet appearance. A rating of less than 3 typically represents unacceptable wear performance.

An additional performance/wear test includes the Hexapod drum tester (ASTM D-5252 or ISO/TR 10361 Hexapod Tumbler). This test is meant to simulate repeated foot traffic over time. It has been correlated that a 12,000 cycle count is equivalent to ten years of normal use. The test is rated on a gray scale of 1 to 5, with a rating after 12,000 cycles of 2.5=moderate, 3.0=heavy, and 3.5=severe. Yet another performance/wear test includes the Radiant Panel Test. Some commercial tiles struggle to achieve a Class I rating, as measured by ASTM E 648-06 (average critical radiant flux>0.45=class I highest rating).

The textile component of the floor mat may be washed or laundered in an industrial, commercial or residential washing machine. Achieving 200 commercial washes on the textile component with no structural failure is preferred.

The following alignment and deployment techniques may be used for installing the multi-component floor mat:

In the first case, it has been found that if the top half is rolled up in a fairly tight roll—face in—and then placed down on the base, that the total attraction force is so reduced that an installer can slide the roll enough to be able to get a good alignment with the base using the exposed end of the roll as a guide to align to the base. This method is mainly envisioned for small two part mats. Alignment marks can be put on the base to assist the top alignment.

The second method is to use the first method but coupled with a removable temporary "mask" that reduces the attractive force. This can be accomplished by using film or paper that is placed down on the base between the rolled up top and the base only in the area where the rolled up top will touch. Now that the total area is greatly reduced by the roll AND the force per unit area is reduced by the mask, then the ease of moving the roll around to achieve alignment is now even greater. Once alignment is achieved, the film or paper is slid out.

A third method, that is a refinement of the removable mask method, is to use a mask that is permanently installed and that selectively masks only the most critical area—i.e. the area directly below the roll, and leaves the area near the mat edge alone. For example, if using a magnetic base and iron containing top, one can use a thin magnetically receptive material known as "FlexIron". This material has the ability to significantly reduce the magnetic force while at the same time strongly sticks to the magnetic base and thus will not move; the result is a permanently installed "mask". This mask is sized and positioned so as to only mask the magnetic force directly below the roll, but leaves the edges alone so as to keep the force high where the edges must resist kicking up. One still manually aligns the roll and its edge to the base, but now the alignment is relatively easy and can be done quickly. Additionally, the base component can be selectively magnetized so that a masking section is not magnetized. The perimeter around the masking section, as well as the perimeter that attracts the edge of the top piece, can be selectively magnetized.

A fourth method can be used in concert with any of the above methods or alone. This method relies on an alignment pins or grommets that can capture two or more of the carpet corners. The pins are located in either the base or top and associated with the pins are complementary holes in the top or base. Once inserted, the pins capture the other half of the carpet requiring such that the two halves cannot be separated without substantial force. Once captured, the top mat can be picked up and gently laid down in alignment with the base. If a mat top should become disturbed or misaligned in the field, it is relatively easy to realign by simply picking the top up and laying it back down. If used in concert with 1-3 above, alignment now becomes not only easy, but quick and precise. Furthermore if care is taken to ensure that the masked area is always below the alignment pins and is sufficient size so that if the top is picked up that where it drapes is masked, then alignment/deployment is always easy.

A fifth method is a refinement of number 4 whereby the attachment pins are hidden and not visible from the face of the mat top. Methods to accomplish this are tightly fitting grommets or strong magnets molded into or glued to the back of the top mat, or grommets with strong magnets-all associated with complimentary holes with or without magnets in the base. This method can also be used in association with any of the 1-3 methods.

Another variation includes a line or pattern of magnetic pairs on one end of the textile component that "snap" the textile component and base component together. These pairs can be spaced such that a single alignment is highly favorable over any other attraction. The magnet pairs may be arranged with opposing poles and the different pairs in the line or pattern have alternating spacing to prevent misalignment.

EXAMPLES

The invention may be further understood by reference to the following examples which are not to be construed as limiting the scope of the present invention.

Several variables were tested:

Test Procedures

Commercial Wash Procedure:
 1. 140 degree Fahrenheit wash for 10 minutes.
 2. 3 rinses, 140 degrees, 3 minutes each.
 3. 2 rinses, 90 degrees, 3 minutes each.
 4. 2 minutes low extraction.
 5. 10 minutes high extraction.

Some samples were evaluated on a "pass" or "fail" basis. A "pass" rating indicates that the textile component did not fall apart, but rather maintained its structural integrity and was suitable for use in its intended purpose. A "fail" rating indicates that one or more layers of the textile component came apart, that the textile did not maintain its structural integrity, and/or the textile was not suitable for use in its intended purpose.

Torture Wash:
 1. 190 degree Fahrenheit wash for 30 minutes.
 2. 2 rinses, 90 degrees, 3 minutes each.
 3. 2 minutes low extraction.
 4. 10 minutes high extraction.

A Torture Wash is intended to be equivalent to 10 commercial washes.

Lateral Movement Test:

The amount of movement in a floor mat is measured using the lateral movement test. First a location on the floor is marked usually using a piece of tape. Next a floor mat is placed at that mark. For a lateral movement walk test, the person conducting the test walks over the test piece 150 times. Each pass must be in the same direction to ensure accurate measurement movement. Once this is done 150 times in the same direction, the person conducting the test must measure how far the test piece is from the original location. This should be done on both of the front corners. Once a walk test is completed, a second Lateral Movement Cart Test is run. This test involves the same process, but requires a cart holding a 100 lb. load to roll over the test piece 50 times. The distance is then measured and recorded.

Thickness Determination:

The thickness of each sample was measured using a Starrett pocket dial gauge. The specific model was the Starrett No. 1010. The pocket dial that was used came with an inspection certificate (Form 804) to ensure accuracy.

Tuft Lock Test:

The tuft lock test was conducted by cutting out a sample of finished textile component approximately 6"×10". Once the sample was cut out, it was placed in a TensiTech tensile testing machine. A tensile testing program was then run allowing the machine to grasp on to a single tuft in the carpet. Once the machine locked on to a single tuft, it recorded how much force was required to pull the tuft out of the rubber backed textile component. This data was then recorded and run 4 more times for a total of 5 pulls. Then, once all tests were complete the data was evaluated making sure all pulls recorded a value higher than 4.0 lbf.

Body Tear Test:

The body tear test was conducted by cutting out a sample of finished textile component approximately 4"×7" with a 2" slit at one end of it. Once the sample was cut out, it was placed in a TensiTech tensile testing machine with one side of the slit in the top clamp, and the other side of the slit in the bottom clamp. A tensile testing program was then run pulling the top clamp upwards. The force required to pull the top clamp up was recorded as the sample ripped in half. This data was then recorded and run 2 more times for a total of 3 pulls. Then, once all tests were complete the data was evaluated making sure all pulls recorded a value higher than 13.0 lbf.

The magnetic hold strength test was conducted by cutting out a 8"×8" sample of finished textile component with smooth magnetically responsive backing. Once the sample was cut out, it was clamped in the top clamp of the Instron tensile testing machine such that the full width of the mat was in the 9 inch wide top clamp to a length of at least 1" inch. A 6"×2" magnetic strip with a magnetic strength of 200 gauss was mounted on a stiff metal plate measuring 10"×8" with the long side oriented in the vertical direction. The metal plate was mounted in an immobile fixture on the base of the machine and aligned parallel to the textile component in such a manner that the magnetic strip was in intimate contact with the magnetically responsive backing of the finished textile component. A testing program was then run pulling the top clamp upwards. The force required to pull the top clamp up was recorded as the sample traversed across the length of the magnetic strip. This data was then recorded and run 2 more times for a total of 3 pulls. Then once all tests were complete the data was evaluated at 0.1" traverse to assess the magnetic hold strength in lbf/inch.

Evaluation of Backing Material

Example 1—Mat with Nitrile Rubber Backing

A mat was prepared as follows:

A tufted face assembly was prepared comprising a nylon 6,6 yarn tufted into a pre-shrunk Lutrador 52 nonwoven primary backing. The nylon 6,6 yarn was $\frac{1}{8}^{th}$ inch gauge and was tufted at 8.70 stiches per inch. Tufts were sheared to a pile height of $\frac{18}{64}^{th}$ inch, resulting in a fabric weight of 20.0 oz/sq. yard. The tufted roll measured 145 inches from outside tuft row to outside tuft row.

The tufted roll was then printed using a Millitron® digital printing machine. The tufted face assembly was run down the Millitron® digital printing machine at a speed of 25 feet/minute. A combination of 12 gun bars was utilized to distribute dye to the tufted face assembly with the dye flow set to 36. The tufted face assembly was then exposed to a first steam step in a steamer at 209° F., and then again in a post steam/stain blocker step at 150° F. The printed tufted face assembly was then dried at 240° F.

The printed tufted face assembly was then slit into 3.2' wide rolls. These rolls were placed on top of 0.130" (thickness) nitrile rubber. The uncured nitrile rubber was then sent into a press with the printed tufted face assembly on top. The press heated up to 365° F. from the bottom as soon as the printed assembly entered the press area. The press then applied pressure at 35 psi to the top of the printed tufted face assembly to push it into the rubber. The printed tufted face assembly was then held in the press for 8 minutes before it was removed. After it was removed, it was preshrunk in a drier at 290° F. to form a washable carpet in roll form. The washable carpet in roll form was then cut into the desired shape and/or size.

In another example, a mat was made with a 0.030" thick magnetically responsive filler loaded nitrile rubber backing. The mat had solution dyed yarn (SDN) yarn tufted in a polyester non-woven primary backing layer. It was bonded to the backing at 370° F. under 35 psi pressure and cured for 4 minutes. No further preshrinking was done. However, the backing layer was then exposed to a needling process to make it porous.

Evaluation of Backing Style

Smooth Nitrile Backed Mat

A smooth rubber backing has no protrusions on the rubber surface of the mat (e.g. the surface of the mat that comes in contact with the magnetic base). In other words, the smooth backing is free from protrusions. Protrusions are typically added to the magnetic base to aid in preventing unintended lateral movement of the mat.

The construction of the washable mat was identical to the mat produced in Example 1. When the nitrile rubber was placed on the press, it was put on a Teflon coated belt that had no indentions in it. The top of the belt was smooth which allowed the bottom of the rubber to have a smooth surface as well.

Gripper (Standard Cleat) Nitrile Backing for Magnetic Base Component

The nitrile rubber for the base was constructed by layering of the magnetic rubber and the rubber without any magnetic fillers with the latter one forming the gripper base. A gripper rubber backing was characterized by having (1) a grid pattern on the rubber surface that was free from protrusions and (2) protrusions on the interior spaces between the protrusion free areas. The protrusions were present in a square pattern. Thus, the gripper backing contained a repeating pattern of small protrusions in areas that were $7/8^{ths}$ inch by 1 inch square. The protrusions were approximately $1/16^{th}$ inch high. The protrusions covered approximately 70 percent of the surface of the rubber backing.

The construction of the washable mat was the same as the mat produced in Example 1. When the nitrile rubber was placed on the press, it was put on a Teflon coated belt that had $1/16^{th}$ inch indention in it in small square patterns. When the press reached 365° F., it caused the rubber to become very soft. Once the pressure of 35 psi was applied to the top of the washable mat assembly, it pushed the soft rubber into the indentions forming the "gripper" pattern.

Megahold Nitrile Backing for Magnetic Base Component

The nitrile rubber for the base was constructed by layering of the magnetic rubber and the rubber without any magnetic fillers with the latter one forming the megahold base. A megahold rubber backing was characterized by having fewer and larger indentations on the rubber surface, when compared to the gripper backing. The indentations were present in groups of four that and were spaced in a square pattern. Thus, the megahold pattern contained a repeating pattern of four large indentations in areas that were 3.625 inches by 3.875 inches square. The indentations were approximately ⅛ inch deep. The indentations covered approximately 40 percent of the surface of the rubber backing.

The construction of the washable mat was the same as the mat produced in Example 1. Before the rubber was placed on to the Teflon belt, the operator placed a metal plate on the belt. The metal plate contained circles on the top surface. The circles included a hole drilled in the center to allow rubber to form on the inside. The nitrile rubber was then placed on top of the metal plate, with the fabric/carpet on top. When the press reached 365° F., it caused the rubber to become very soft. Once the pressure of 35 psi was applied to the top of the washable mat assembly, it pushed the soft rubber around and into the metal plate forming the "Megahold" backing.

Evaluation of Magnetic Coating Thickness on Textile Component

The magnetic backcoating layer thickness was varied. Samples were prepared with 20 mils, 25 mils and 30 mils of magnetic backcoating. The backcoatings were applied to Forever® mats from Milliken & Company of Spartanburg, SC. These mats were then subject to the standard wash and body tear test and a magnetic shear hold test.

To perform the magnetic shear hold test a test set-up was created where the bottom grip of an Instron was replaced by a vertical aluminum plate with a permanent magnet sheet attached. The permanent magnetic sheet was similar in construction and in magnetic strength (measured in Gauss) to the magnetic base component that the magnetic backcoated textile component was installed on. The magnetic backcoated textile component was gripped on the top jaw of the test frame such that the magnetic backcoating was attached to the permanent magnet sheet. The assembly was adjusted to ensure that the backcoated textile component moved parallel to the face of the magnetic sheet on the aluminum plate when the top jaw was moved at a rate of 12 inches/minute. The force on the load cell after a 1" traverse was recorded as the magnetic shear force.

The results from testing the backcoated textile at 1×, 10× and 20× torture washes is presented in Table 1 below.

TABLE 1

Evaluation of Magnetic Coating Thickness on Textile Component After Washing

| Mat | Units | Control mat- 53 mil | Coating Thickness 30 mil | | | Coating Thickness 25 mil | | | Coating Thickness 20 mil | | |
|---|---|---|---|---|---|---|---|---|---|---|---|
| | | 1X | 1X | 10X | 20X | 1X | 10X | 20X | 1X | 10X | 20X |
| Trouser tear force | lb | 32.6 | 23.2 | 23.9 | 23.9 | 20.7 | 24.2 | 23.7 | 20.9 | 23.5 | 21.9 |
| Tuft Lock force | lb | 4.9 | 4.9 | 5.0 | 4.2 | 5.2 | 4.9 | 4.8 | 4.5 | 4.2 | 3.6 |
| Magnetic Hold (Shear) | gf | — | 450.5 | 350.0 | 539.0 | 359.0 | 160.0 | 184.0 | 370.5 | 94.0 | 103.5 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

We claim:

1. A multi-component floor mat comprising:
   (a) a textile component comprised of a first layer of tufted pile carpet formed by tufting face yarns through a primary backing layer, and a second layer of vulcanized rubber material that contains magnetic particles, wherein the textile component is characterized by having a substantially uniform thickness; and
   (b) a base component comprised of an elastomer having a discontinuous magnetic coating comprising magnetic particles pattern coated thereon;
   wherein the textile component and the base component are releasably attachable to one another via magnetic attraction, and wherein the vulcanized rubber material of the textile component and the elastomer of the base component are comprised of different materials.

2. A process for cleaning a multi-component floor mat, said process comprising the steps of:
   (a) Providing a multi-component floor mat, said mat comprising:
       (i) a textile component comprised of a first layer of tufted pile carpet formed by tufting face yarns through a primary backing layer, and a second layer of vulcanized rubber material that contains magnetic particles, wherein the textile component is characterized by having a substantially uniform thickness; and
       (ii) a base component comprised of an elastomer having a discontinuous magnetic coating comprising magnetic particles pattern coated thereon; wherein the textile component and the base component are releasably attachable to one another via magnetic attraction, and wherein the vulcanized rubber material of the textile component and the elastomer of the base component are comprised of different materials;
   (b) Removing the textile component from the base component; and
   (c) Laundering the textile component in an industrial, commercial, or residential washing machine.

3. The process of claim 2, wherein the step of laundering is accomplished via a commercial wash cycle.

4. The process of claim 3, wherein the textile component is suitable for re-use after exposure to 200 commercial wash cycles.

5. A process for making a multi-component floor mat, said process comprising the steps of:
   (a) Tufting face yarns into a primary backing material to form a tufted pile carpet;
   (b) Printing the tufted pile carpet with printing ink;
   (c) Providing a layer of unvulcanized rubber that contains magnetic particles;
   (d) Adhering the tufted pile carpet to the layer of magnetic particle-containing unvulcanized rubber via a rubber vulcanization process to form a washable textile component having a vulcanized rubber backing, wherein the textile component is characterized by having a substantially uniform thickness;
   (e) Cutting the textile component into a desired shape and size;
   (f) Providing a base component comprised of an elastomer;
   (g) Pattern coating the base component with magnetic particles to form a discontinuous magnetic coating thereon; and
   (h) Attaching the textile component to the base component via magnetic attraction.

6. The process of claim 5, wherein the tufted pile carpet is exposed to a heat stabilizing process.

7. The process of claim 5, wherein the magnetic particles are magnetized in-line with the process for making the multi-component floor mat via a permanent magnet.

8. The process of claim 5, wherein the base component is characterized as being flat with no recessed or tray area.

9. A process for making a multi-component floor mat, said process comprising the steps of:
   (a) Tufting face yarns into a primary backing material to form a tufted pile carpet;
   (b) Printing the tufted pile carpet with printing ink;
   (c) Providing a magnetic coating comprised of magnetic particles and a binder material;
   (d) Adhering the magnetic coating to the tufted pile carpet to form a washable textile component, wherein the textile component is characterized by having a substantially uniform thickness;
   (e) Cutting the textile component into a desired shape and size;
   (f) Providing a base component comprised of an elastomer;

(g) Pattern coating the base component with magnetic particles to form a discontinuous magnetic coating thereon; and (h) Attaching the textile component to the base component via magnetic attraction.

10. The process of claim 9, wherein the magnetic coating is adhered to the tufted pile carpet via a lamination process.

11. The process of claim 10, wherein the lamination process is carried out at a temperature in the range from 200 degrees F. to 500 degrees F. and at a pressure in the range from 10 psi to 50 psi.

12. The process of claim 9, wherein the base component is characterized as being flat with no recessed or tray area.

* * * * *